Jan. 10, 1950 H. W. WISHART 2,493,906
VULNERABILITY VALVE
Filed April 24, 1943 2 Sheets-Sheet 2
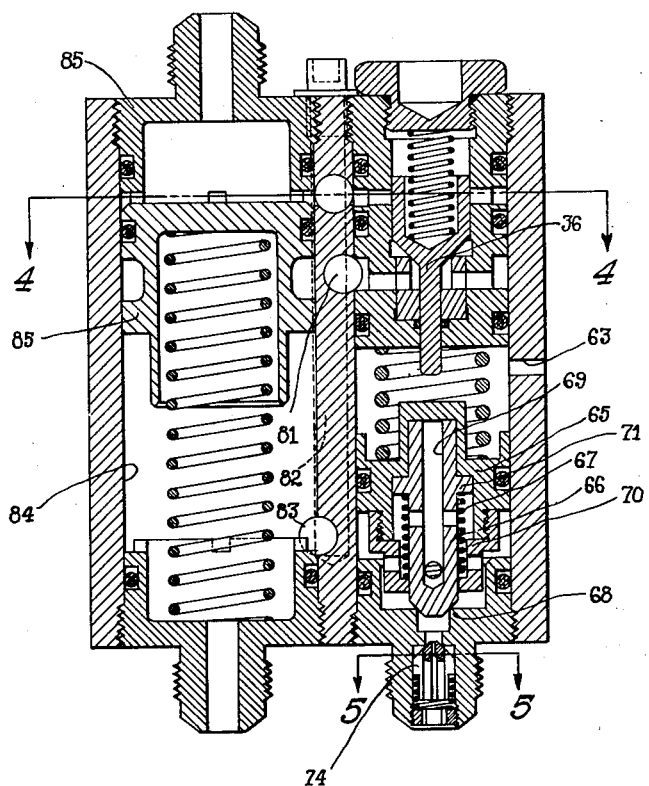
Fig. 3
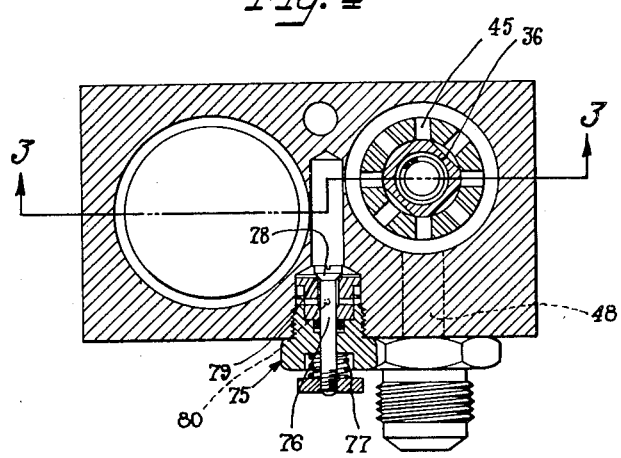
Fig. 4
Fig. 5
INVENTOR
HERBERT W. WISHART
BY
ATTORNEY Patented Jan. 10, 1950

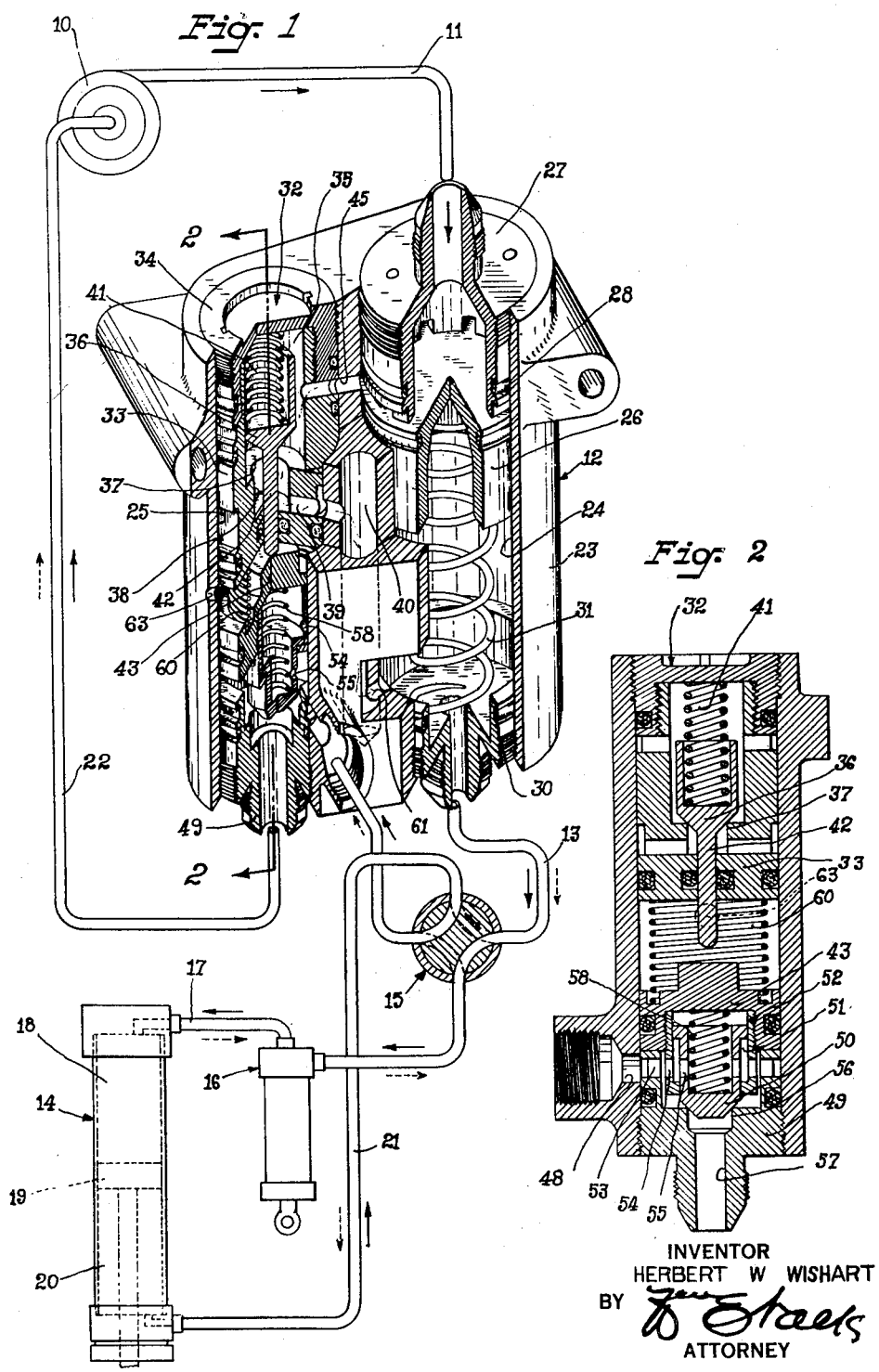

2,493,906

UNITED STATES PATENT OFFICE 2,493,906

VULNERABILITY VALVE

Herbert W. Wishart, University City, Mo., assignor to Curtiss-Wright Corporation, a corporation of Delaware Application April 24, 1943, Serial No. 484,455

10 Claims. (Cl. 60—52)

This invention relates to an automatically operable valve which, although not necessarily limited to such use, is characterized by features which render it of particular utility as an adjunct to the hydraulic system of an airplane, the valve being adapted, when so employed, to isolate the branch of the system in which it is incorporated in the event that any of the lines or fittings of such branch are ruptured, thereby preventing the loss of substantial amounts of hydraulic fluid from the system and hence insuring the continued normal operation of the various instrumentalities or mechanisms adapted to be actuated by the fluid in the other branches of the system.

In the present hydraulic systems for aircraft, no provision is made other than a manually operable valve for closing off a cut off or ruptured line. When a line of such a hydraulic system is ruptured by gun fire, unless immediate steps are taken by the pilot to manually close off the branch including such line, the fluid from the main reservoir will have become exhausted, thereby rendering inoperative other branches of the hydraulic system, as well as the ruptured branch. The detecting of the cut off or ruptured part of the system is left entirely to the alertness of the pilot. If the pilot is in combat with his airplane, he is given little time to detect this condition of his fluid system. Often by the time the discovery is made, it is too late for him to operate the manual valve and the fluid from the main reservoir will have been lost.

One object of the invention, therefore, is to provide a valve which is so designed that it will permit normal flow of actuating fluid to and through the lines of the branch of the hydraulic system in which it is incorporated but which, in the event that a line of said branch is for any reason ruptured, will automatically isolate said branch from the fluid source and from the other branches of the system, thereby preventing draining of the hydraulic fluid of the system through the ruptured line, and hence insuring the continued normal flow of such fluid to and through the other branches of said system and, therefore, the normal functioning of the fluid-actuated instrumentalities of such branches.

It is another object of the invention to provide such a valve which will permit normal flow of fluid therethrough, yet so constructed that the rate of this flow through the valve, if changed, will not tend to close off the same, or in other words, to provide a valve of this type which will be unaffected by line surges or changes in the rate of flow through the valve.

It is another object of the invention to provide in such a valve a body of fluid usable to supply the auxiliaries serving as a part of the hydraulic system and thus a type of valve which is not dependent upon the maintenance of a solid column of fluid in the supply and return lines to and from a fluid actuator, i. e. to and from a fluid motor or other device actuated by fluid.

According to the present invention, there has been provided a valve having a displacement chamber in which there is always on tap a body of fluid which, when delivered to the supply line, is sufficient in quantity to actuate any auxiliary disposed therein while the auxiliary is cut off from the main source of fluid. A directional valve is located in the pipe line connections with the fluid actuator and as it is turned to start the flow of fluid to and from the fluid actuator, a portion of this body of fluid is delivered to the supply line. As soon as a return flow of fluid has been initiated by the displaced portion of said body of fluid a normally closed bypass valve is open to permit fluid from the main pressure source to flow around said body of fluid directly to the auxiliary and the fluid actuator. Not until the by-pass valve has been actuated is a second valve operated to direct the return fluid from the actuator back to the main reservoir or fluid pressure source. Upon failure or rupture of the supply or return line to the fluid actuator, and the loss of the return flow of fluid to the valve, the by-pass valve is automatically closed, the same having been kept open by and being dependent upon the return fluid flow. The loss of fluid from the main system in addition to the amount of fluid in the fluid supply and return lines is thus limited to the amount of fluid contained in the displacement chamber. Upon repair of the ruptured line, the automatically operable valve may be primed by a priming means disposed between the pressure supply line and the under side of the displacement piston.

For other objects and for a better understanding of the invention, reference may be had to the following detailed description taken in connection with the accompanying drawing, in which Fig. 1 is a more or less diagrammatic view of a hydraulic system such as used on airplanes and embodying the vulnerability valve of the present invention, the valve being shown in the perspective and broken away to show the vital parts thereof.

Fig. 2 is a cross-sectional view, in elevation, taken through the sequencing chamber of the valve and along the line 2—2 of Fig. 1.

Fig. 3 is a cross-sectional view, in elevation, taken along the line 3—3 of Fig. 4, of a modified form of valve differing mainly from the other valve in the construction of the sequencing chamber parts.

Fig. 4 is a cross-sectional view taken along the line 4—4 of Figure 3 and in a plane to show the priming mechanism.

Fig. 5 is a cross-sectional view in another plane taken through the return flow fitting of the valve and showing the restricter valve therein and along the line 5—5 of Fig. 3.

Referring now particularly to Figs. 1 and 2, there is shown a fluid pressure source or reservoir 10 adapted to deliver fluid under pressure through a pipe line 11 to a vulnerability valve 12 of the present invention. The fluid leaves the vulnerability valve through a supply line 13, and is directed to one side or another of a fluid actuator 14 depending upon the position to one side or another of neutral of a four-way or directional valve 15. With the directional valve 15 set as shown in Fig. 1, fluid will continue from supply line 13 to an auxiliary 16 which, as shown, may be a hook-up latch for landing gear of an airplane and thence after operating the same through line 17 to side 18 of the fluid actuator 14. The fluid actuator 14 includes a piston 19 which divides the side 18 of the fluid actuator from a side 20 from which fluid will be forced through a return pipe line 21 for delivery to the valve 12. After the fluid being returned through the pipe line 21 operates the valve 12, it is returned to the fluid reservoir 10 through a main return pipe 22.

The valve 12 includes a housing 23 in which is disposed a displacement chamber 24 and a sequence valve chamber 25. Within the displacement chamber 24, there is disposed a piston 26 adapted to be acted upon by fluid entering the valve 12 from the fluid pressure source 10 by way of the pipe 11. The entry of this fluid is through a fitting 27 which is screwed into the chamber 24 to close one end thereof. Fitting 27 is provided with a sealing ring 28 and the lower end thereof serves as a stop against which the piston 26 is arrested in its upward movement.

The lower end of the chamber 24 is closed by a fitting 30 similar to fitting 27 and on which is supported a compression spring 31 adapted to normally force the piston 26 up against the fitting 27. With fluid being disposed on both sides of the piston 26, the piston 26 would be balanced except for the action of the spring 31. It will be more apparent as to how the fluid on the lower side of the piston 26 is obtained as the description proceeds.

Within the sequence valve chamber 25, there is provided a poppet valve unit 32. This unit includes a main body member 33 on which there is threaded a closure cap 34 to provide a closed chamber 35. Within this chamber 35 there is a poppet valve element 36 adapted to seat against a seat portion 37 of the body 33 to control the flow of fluid from the chamber 35 through a passageway 38 which extends downwardly and laterally as indicated at 39, for delivery of fluid to a downwardly extending bypass duct 40 within the valve housing 23. The poppet valve 36 is hollowed out at its top to contain a spring 41 arranged to bear against the cap 32 to normally force the poppet valve 36 toward its seat portion 37. The poppet valve 36 also has a stem portion 42 adapted to extend through a central opening in the bottom of the body member for contact with an operating plunger 43.

Communicating between the displacement chamber 24 at the upper side of the piston 26 and the chamber 35 within the body member and located partly in the housing 23 and partly in the main body member 33, is a cross passage 45. Through this passage, fluid under pressure is passed to fill the chamber 35 and to further lock the poppet valve against its seat portion 37, as shown in Fig. 2, so as to positively seal off the fluid in the chamber 35 from the passages 38, 39, and 40. As long as the poppet valve 36 is closed, fluid from the line 11 will not flow through the valve 12.

As the four-way valve 15 is turned to effect actuation of the fluid actuator 14, fluid will be delivered to the supply line 13 from the displacement chamber 24 under action of the fluid pressure upon the piston 26. The amount of fluid in the chamber 24 is sufficient to fill the auxiliary 16 for its actuation and to cause the delivery of the fluid therefrom through pipe 17 to the side 18 of the fluid actuator. As soon as this takes place the piston 19 within the fluid actuator 14 is moved downwardly so as to force fluid from the side 20 thereof through the return line 21 and valve 15 to the valve 12. The return pipe 21 enters the valve 12 at the side of the same and fluid therefrom enters an inlet opening 48, Fig. 2, for delivery to the sequencing valve chamber 25. Prior to the admission of the supply fluid through the opening 48, the plunger 43 is disposed in its lowered position, as shown in Fig. 2, and against a seat 56 provided by an outlet fitting 49 which is screwed into the housing 23 in much the same manner in which fittings 27 and 30 are screwed into the housing 23. The plunger 43 has in its bottom thereof, a return pipe closure valve element 50 which is connected to the plunger 43 to have lost motion with respect thereto in an opening 51 formed in a cup-shaped fitting 52 threadingly connected with the plunger 43. Fluid entering the opening 48 passes through openings 53 in the fitting 49, openings 54 in the fitting 52, and openings 55 in the return fluid valve element 50. Pressure is immediately built up against the return fluid valve 50 to temporarily maintain the same against the seat 56 so as to temporarily prevent the flow of fluid through an outlet 57 in the fitting. Also a spring 58 extending between the valve element 50 and the plunger element 43 aid to maintain the valve 50 against the seat 56.

Fluid pressure is thus allowed to build up against the plunger element 43 so that it is moved upwardly against the action of a spring 60 to contact the stem 42 of the poppet valve element 36. This upward movement of the plunger 43 continues until the poppet valve 36 is lifted off its seat 37 to the position shown in Fig. 1, whereupon fluid on the upper side of the displacement piston 26 will be delivered through passage 45 to the vertically extending bypass 40, which extends downwardly to the bottom of the housing for connection with a lateral inlet opening 61 to chamber 24. In this manner fluid is bypassed about the piston 26 and a continuous flow from the fluid source 10 will be effected through the valve 12 as long as the four-way valve 15 is in position to cause actuation of the fluid actuator 14. As soon as the fluid pressure at the lower side of the piston 26 approaches the pressure at the upper side of the piston, the latter will be returned by spring 31 to its initial position, thereby replacing the fluid in the chamber 24 which was initially forced from the same to start the actuation of the fluid actuator. When the lost motion between fitting 52 and valve element 50 has been taken up during upward movement of plunger 43, valve element 50 is lifted to permit a return flow from opening 48 through passage 57 and pipe 22 to the pressure source 10.

Should a rupture occur in any of the lines of the fluid system, such as due to either of the lines 13 and 21 being shot off, the return flow of fluid through the pipe line 21 is lost and fluid serving to hold the plunger 43 in its up position against the poppet valve stem 42 is lost. The plunger 43 will then move downward, the space above the plunger being capable of breathing through an air opening 63. The poppet valve 36 will thereupon be closed and fluid flow through the by-pass 40 is immediately disrupted, whereby, after an emptying of chamber 24, the fluid supply line 13 is positively closed off. As the plunger 43 with the return flow valve 50 moves downwardly, the return valve 50 will finally contact with its seat portion 56 to thereby positively close off the flow to the return line 22. The valve will have in this manner isolated from main pressure source 10 the branch of the system which includes the ruptured line. Draining of the actuating fluid from the entire hydraulic system through the ruptured line being thus prevented, adequate fluid will remain in the system to feed the lines of all of the other branches. Except for the branch having the ruptured line, therefore, the entire system will continue to function in the normal manner.

Referring now more particularly to Figs. 3, 4, and 5, there is shown a modified form of the valve. The general operation of the valve is the same as the valve just described, but there are features in it which render the valve more positive in its actuation and easier to construct. The description thereof will thus be limited to the features of this valve which are different from the valve just described. It has a plunger element 65 formed to include a return fluid valve element 66 of such construction that its operating spring 67 is disposed about the valve element 66 rather than within an opening in the same. As the plunger 65 is moved upwardly, the valve 66 is maintained on its seat 68 only by action of fluid pressure acting within a hollow chamber 69 rather than by action of its spring. The plunger element 65 moves upwardly without the valve element 66 until such time as its shoulder 70 positively engages a shoulder 71 on the valve element 66, at which time the valve element 66 will be bodily moved upwardly with the plunger. This opening of the valve 66 takes place only after poppet valve 36 has been opened.

With such an arrangement as shown by this form of the invention, the valve element 66 can not be closed until after the poppet valve 36 is closed. This is because of the action of spring 67 which positively maintains the valve element 66 collapsed within the plunger 65.

In order to prevent a sudden outflow of fluid to the return pipe line 22 and in that way tending to drop the plunger so as to close the poppet valve 36, there is provided a restrictor element 74 in the fitting 49. This restrictor element will tend to throttle all fluid leaving the valve and in that way will prevent the plunger from suddenly permitting the valve 36 to close off the supply flow of fluid through the valve. This element will also serve to restrict any effects from back pressure which might occur in line 22.

As seen more readily in Fig. 4, there is shown priming means 75 including a plunger 76 adapted to be depressed against the action of a spring 77. This plunger element 76 has a valve head 78 adapted to seat against a valve seat 79. This priming means is in communication with the fluid pressure source 10 and as the plunger 76 is depressed, fluid will be taken from the fluid pressure source and be delivered through an opening 80 to a lateral extending opening 81 which is in communication with a vertically extending bypass 82 which delivers the fluid to an opening 83 which is in communication with the displacement chamber 84. This priming action will continue until sufficient fluid has been built up in the fluid system and within the chamber 84 so as to return its piston 85 to the upper portion of the chamber 84 and against its fitting 86.

It should now be apparent that there has been provided a valve arrangement particularly adaptable for use in aircraft which will serve to permit flow as long as the branch of the system with which the valve is associated has not been ruptured but will automatically cut off the flow to the said section, should the supply and return lines be shot off or ruptured. It should also be apparent that there has been provided with this type of valve a displacement chamber suitable to contain sufficient amount of fluid to fill the auxiliary 16 and to establish a continuous flow of fluid to the fluid actuator 14, and also that there has been provided such a valve arrangement whereby the changes in the rate of flow, as established by the fluid pressure source, will not affect the operation of the valve and that the action to close off the valve is positive and unaffected by the fluid pressure source.

While various changes may be made in the detailed construction, it shall be understood that such changes shall be within the spirit and scope of the present invention as defined by the appended claims.

I claim as my invention:

1. In combination, a fluid pressure source, a double acting fluid motor, a safety valve connected by incoming and return lines to the fluid pressure source and to the double acting fluid motor by means of pipe lines which are subject to rupture, a fluid actuated auxiliary connected in one of the lines leading from said safety valve to said motor, a directional valve in the pipe lines to determine the direction of flow to and from the fluid motor, said safety valve having means for maintaining a body of fluid of sufficient quantity and operable by the incoming fluid to actuate the fluid actuated auxiliary, and means dependent upon the return fluid flow from the fluid motor for bypassing the flow of incoming fluid around the maintaining means to continue its flow to the auxiliary and to the fluid motor, and, after this flow has been established, for directing the return fluid to the pressure source return line.

2. In a vulnerability valve, a valve housing having a displacement chamber with a piston therein and a sequence valve chamber, bypass means for circumventing fluid about the displacement piston for delivery to an outlet in the valve housing, said bypass means including a poppet valve located in the sequence valve chamber, a plunger in the sequence valve chamber for operating the poppet valve, said plunger being adapted to be operated by fluid flow being returned to the valve, a return fluid valve connected to the plunger to have lost motion movement with respect thereto whereby the return fluid valve may remain on its seat during a part of the stroke of the plunger and will be opened after the by-pass poppet valve has been opened, said fluid return valve when open putting return fluid in communication with an outlet opening of the valve, whereby the bypass valve and fluid return valves are both operated by fluid return flow and in a sequential manner.

3. In a vulnerability valve, a fluid housing having a displacement chamber with a piston therein and a sequence chamber extending therethrough, a pair of passageways extending between the two chambers to bypass fluid about the piston, said passageways entering the chambers at different levels, a container with a poppet valve therein mountable as a unit in one end of the sequence chamber and having openings therein controllable by the poppet valve and adapted to register with the respective passageway means to control the flow of fluid therethrough, a plunger in the sequence chamber adapted to be moved by return fluid flow to the valve, said poppet valve extending from its container to be operated by the plunger, a return fluid outlet valve adapted to be seated in an outlet fitting closing the opposite end of the sequence chamber, and lost motion connection means for connecting the return fluid outlet valve to the plunger so as to permit operation of the poppet valve prior to the operation of the return fluid outlet valve, said plunger thereby serving to operate both valves and in a sequential manner.

4. In a vulnerability valve, a fluid housing having a displacement chamber with a piston therein and a sequence chamber, passageway means in the housing extending between the two chambers to bypass fluid about the piston to establish continuous flow through the valve, poppet valve means in the sequence chamber to control the flow of fluid through the passageway means, plunger means in the sequence chamber spaced from said poppet valve means, adapted to be acted upon by return fluid and arranged to operate the poppet valve means only after it has moved a predetermined distance toward said poppet valve means, a return fluid outlet valve connected to the plunger for lost motion movement with respect thereto, biasing means between the return valve and the plunger tending to maintain the valve collapsed within the plunger, passage means within the return valve to permit the retaining of the same on its seat by fluid acting upon it and against the action of the biasing means to cause lost motion to be taken up and the operation of the bypass poppet valve before opening of the return valve to divert the return flow through its outlet opening, said biasing means, by virtue of its tendency to collapse the return valve within the plunger in a direction opposite to that in which the return valve must be moved to be seated preventing closure of the return outlet opening before closure of the bypass poppet valve.

5. An automatic control device for a fluid-operated system which includes a source of fluid under pressure, a fluid motor, and supply and return lines connecting said motor to said source, said automatic control device having a passage through which fluid traversing the supply line may flow and a second passage through which fluid traversing the return line may flow, a valve for closing said first mentioned passage, a second valve for closing said second passage, resilient means for normally holding said valves closed, a piston which is movable in response to the fluid pressure in said supply line upstream from said first mentioned valve to effect an initial displacement of fluid in said return line, a second piston carrying one of said valves and having a lost-motion connection with the other and being movable in response to such displacement to open said valves successively against the action of said resilient means to thereby first permit fluid to flow through said first mentioned passage to said motor and secondly to permit fluid to flow through said second passage to said source, and resilient means for restoring said first mentioned piston to its original position after said valves have been opened in the manner described, said valves being held open thereafter by the flow of fluid through said second passage and being closed automatically by said first mentioned resilient means in the event of an interruption in such flow.

6. An automatic control device for a fluid-operated system having supply and return lines, said automatic control device having a passage through which fluid traversing the supply line may flow and a second passage through which fluid traversing the return line may flow, a valve for closing said first mentioned passage, a second valve for closing said second passage, resilient means for normally holding said valves closed, a piston which is movable in response to the fluid pressure in said supply line upstream from said first mentioned valve to effect an initial displacement of fluid downstream from said first valve, a second piston carrying one of said valves and having a lost-motion connection with the other and being movable in response to such displacement to open said valves successively against the action of said resilient means to thereby first permit fluid to flow through said first mentioned passage and secondly to permit fluid to flow through said second passage, and resilient means for restoring said first mentioned piston to its original position after said valves have been opened in the manner described, said valves being held open thereafter by the flow of fluid through said second passage and being closed automatically by said first mentioned resilient means in the event of an interruption in such flow.

7. In an automatic valve, a body having a displacement chamber communicating at its opposite ends with a pressure inlet port and a pressure outlet port; a piston movable in said displacement chamber upon entry of fluid from said pressure inlet port into said chamber to displace chamber fluid through the pressure outlet port; a by-passage around said piston and communicating with said pressure inlet and outlet ports; a return passage communicating at its opposite ends with a return inlet port and a return outlet port; a poppet valve seat in each of said passages; a poppet valve for closing upon the valve seat in the by-passage and opening in a direction opposite to the normal direction of flow through the by-passage; an operating chamber in said return passage adjacent the valve seat therein; a plunger arranged for movement in said operating chamber, in response to fluid pressure in the return passage, in the direction of opening movement of said poppet valve; an opening between said operating chamber and said by-passage; a stem in said opening substantially aligned axially with said poppet valve and plunger, said stem being movable by said plunger to open said poppet valve; said plunger having associated therewith a valve face for closing upon the valve seat in the return passage; and resilient means acting upon said plunger and poppet valve to retain them in their valve closing positions in the absence of fluid pressure in the return passage.

8. In an automatic valve, a body having a displacement chamber communicating at its opposite ends with a pressure inlet port and a pressure outlet port; a piston movable in said displacement chamber upon entry of fluid from said pressure inlet port to displace chamber fluid through the pressure outlet port; a by-passage around said piston and communicating with said pressure inlet and outlet ports; a return passage communicating at its opposite ends with a return inlet port and a return outlet port; a poppet valve seat in each of said passages, said valve seats being substantially aligned axially and being adapted to seat valves that are arranged to open in the same direction; an opening in a wall of the body separating said passages; and valve means for closing upon said valve seats and including a valve operating member extending through and movable axially in said opening, said valve means being operable to open from said valve seats in response to fluid pressure in the return passage.

9. In an automatic valve, a body having a displacement chamber communicating at its opposite ends with a pressure inlet port and a pressure outlet port; a piston movable in said displacement chamber upon entry of fluid into the latter from the pressure inlet port to displace chamber fluid through the pressure outlet port; a by-passage around said piston and communicating with said pressure inlet and outlet ports; a return passage communicating at its opposite ends with a return inlet port and a return outlet port; an operating chamber communicating with said return passage; a plunger in said operating chamber movable in one direction therein in response to pressure in the return passage; each of said pasages having a poppet valve seat substantially aligned axially with said plunger; a poppet valve for closing upon each of said seats, said poppet valves both opening from their seats in said one direction; means for opening the by-passage valve upon movement of said plunger in said one direction comprising a stem extending through a wall which separates said passages; a play connection between the plunger and the return passage valve, whereby the latter will open later and close earlier than the by-passage valve; and resilient means for biasing the valves to closed position.

10. In an automatic valve, a body having a displacement chamber communicating at its opposite ends with a pressure inlet port and a pressure outlet port; a piston movable in said displacement chamber upon entry of fluid into the latter from the pressure inlet port to displace chamber fluid through the pressure outlet port; a by-passage around said piston and communicating with said pressure inlet and outlet ports; a return passage communicating at its opposite ends with a return inlet port and a return outlet port; an operating chamber communicating with said return passage; a plunger in said operating chamber movable in one direction therein in response to pressure in the return passage; each of said passages having a poppet valve seat substantially aligned axially with said plunger; a poppet valve for closing against the valve seat in the return passage, said valve having a limited axial movement in a valve guide chamber formed within said plunger; spring means in said valve chamber biasing said valve to the limit of its movement relative to the plunger in the direction toward the valve seat in the return passage; a second poppet valve for closing upon the valve seat in the by-passage, means comprising a valve stem for opening said second valve upon movement of said plunger in said one direction, and spring means in said operating chamber for biasing the plunger in the opposite direction to seat the second valve in the absence of fluid pressure in the return passage.

HERBERT W. WISHART.

REFERENCES CITED

The following references are of record in the file of this patent:

UNITED STATES PATENTS

| Number | Name | Date |
| --- | --- | --- |
| 1,775,856 | Hauser | Sept. 16, 1930 |
| 2,263,470 | Perkins | Nov. 18, 1941 |
| 2,428,150 | Field | Sept. 30, 1947 |